(12) United States Patent
Barth et al.

(10) Patent No.: US 9,404,796 B2
(45) Date of Patent: Aug. 2, 2016

(54) OPTICAL SENSOR ARRANGEMENT

(71) Applicant: Airbus Defence and Space GmbH, Ottobrunn (DE)

(72) Inventors: Jochen Barth, Oberschleissheim (DE); Thomas Roth, Munich (DE); Christian Czeslik, Unterschleissheim (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/394,934

(22) PCT Filed: Mar. 22, 2013

(86) PCT No.: PCT/DE2013/000161
§ 371 (c)(1),
(2) Date: Oct. 16, 2014

(87) PCT Pub. No.: WO2013/156013
PCT Pub. Date: Oct. 24, 2013

(65) Prior Publication Data
US 2015/0144794 A1    May 28, 2015

(30) Foreign Application Priority Data

Apr. 17, 2012   (DE) .......................... 10 2012 007 677

(51) Int. Cl.
| | | |
|---|---|---|
| *G01J 5/02* | (2006.01) |
| *G01J 1/42* | (2006.01) |
| *G01S 7/48* | (2006.01) |
| *F42B 15/01* | (2006.01) |
| *F42C 13/02* | (2006.01) |
| *G01S 7/481* | (2006.01) |
| *G01S 7/495* | (2006.01) |
| *G01J 1/02* | (2006.01) |
| *G01J 1/44* | (2006.01) |
| *G01J 1/04* | (2006.01) |
| *G01S 3/782* | (2006.01) |

(52) U.S. Cl.
CPC .............. *G01J 1/4257* (2013.01); *F42B 15/01* (2013.01); *F42C 13/02* (2013.01); *G01J 1/0437* (2013.01); *G01J 1/4228* (2013.01); *G01J 1/44* (2013.01); *G01S 7/4804* (2013.01); *G01J 1/0488* (2013.01); *G01J 2001/0285* (2013.01); *G01J 2001/446* (2013.01); *G01S 3/782* (2013.01); *G01S 7/4816* (2013.01); *G01S 7/495* (2013.01)

(58) Field of Classification Search
CPC ............................... G01S 7/4804; G01S 3/782
See application file for complete search history.

(56) References Cited

U.S. PATENT DOCUMENTS

| | | |
|---|---|---|
| 5,428,215 A | 6/1995 | Dubois et al. |
| 6,091,126 A | 7/2000 | Costard et al. |

(Continued)

FOREIGN PATENT DOCUMENTS

| | | |
|---|---|---|
| DE | 697 35 990 T2 | 1/2007 |
| EP | 0 236 035 A2 | 9/1987 |

OTHER PUBLICATIONS

International Search Report dated Aug. 8, 2013 (Three (3) pages).

*Primary Examiner* — David J Makiya
*Assistant Examiner* — Kenneth J Malkowski
(74) *Attorney, Agent, or Firm* — Crowell & Moring LLP

(57) ABSTRACT

An optical sensor arrangement includes two sensors arranged one behind the other. The operational spectral ranges of the sensors match, and the first sensor forms an attenuation filter for the second sensor, which is arranged behind the first sensor.

7 Claims, 3 Drawing Sheets

(56) References Cited

U.S. PATENT DOCUMENTS

| | | |
|---|---|---|
| 6,632,701 B2 | 10/2003 | Merrill |
| 7,683,310 B1 | 3/2010 | Sinclair et al. |
| 2004/0178463 A1 | 9/2004 | Merrill et al. |
| 2005/0087829 A1* | 4/2005 | Merrill et al. ................. 257/440 |
| 2007/0241260 A1* | 10/2007 | Jaeger ............... H01L 31/02162 250/214.1 |
| 2008/0002192 A1* | 1/2008 | David ........................ 356/141.5 |
| 2011/0058152 A1 | 3/2011 | Barth |

* cited by examiner

— PRIOR ART —

OPTICAL SENSOR ARRANGEMENT

BACKGROUND AND SUMMARY OF THE INVENTION

Exemplary embodiments of the invention relate to an optical sensor arrangement.

Optical sensor arrangements are, for example, used for the detection of pulsed laser sources that signal a threat. These lasers can be classified according to wavelength and radiation intensity:

Beamrider weapon systems, near infrared region (NIR) region, a few mW/m2 to a few W/m2 and Target designators and rangefinders, 1064 nm, beam intensity up to a few MW/cm2.

A saturation requirement is placed on laser detectors (which are intended to detect a radiation intensity of a few mW up to a few MW), that the sensor (detector) may not saturate, so that the dynamic range comprises at least 6 orders of magnitude. At the same time the detection of pulsed laser radiation requires high time resolution of the sensor. These requirements cannot be fulfilled with a single sensor that is known from the prior art, but sensor arrangements are usually selected that comprise two sensors S1, S2 disposed adjacent to each other with respectively associated entry windows F1, F2, wherein each individual sensor respectively detects only part of the desired dynamic range (FIG. 1).

If the sensor is also equipped with an optical arrangement in order to optimize the effective aperture of the sensor and the detected image angle, then each sensor is provided with a dedicated optical arrangement O1, O2. This increases the cost in terms of space and components for the design of a laser detector sensor.

U.S. Pat. No. 5,428,215 A discloses an arrangement comprising individual, parallel constructed channels for the detection of the dynamic range. The described sensor arrangement is known on the commercial market under the name HARLID®.

Sandwich diodes, which utilize the principle of the "vertical color filter detector group", are known from U.S. Pat. No. 6,632,701 A. These detectors are commercially available in the combination Si/InGaAs. They comprise a plurality of stacked semiconductor layers with n and p doping, wherein the resulting respective p-n junctions form photodiodes. The individual photodiodes operate wavelength-selectively in different wavelength ranges. A similar design principle is disclosed by U.S. Pat. No. 7,683,310 B1 in the form of photodetectors disposed in series, wherein the individual detectors are designed for different wavelengths.

European patent document EP 0 236 035 A2 discloses a laser detector sensor, with which a plurality of linear detector arrays are disposed in the image plane of an imaging optical arrangement, which respectively monitor a strip section of the environment, wherein said strip sections are each at different distances from the sensor.

These arrangements are undesirable due to the limited dynamic range.

Exemplary embodiments of the invention are directed to a sensor arrangement with which the dynamic sensitivity is increased while maintaining the spectral wavelength range.

The optical sensor arrangement according to the invention comprises a sensor for the detection of electromagnetic waves and an aperture associated with the sensor, wherein at least two sensors disposed in series are provided for the detection of the electromagnetic waves entering through the aperture.

The at least two sensors disposed in series have matching spectral regions and cover the same region of the surroundings to be observed. The sensors are thus sensitive in coincident spectral regions. The sensors are exposed to radiation of the same wavelength but of different intensity.

BRIEF DESCRIPTION OF THE DRAWING FIGURES

The invention and other advantages of the invention are explained in detail using figures. In the figures.

DETAILED DESCRIPTION

Figure 1:
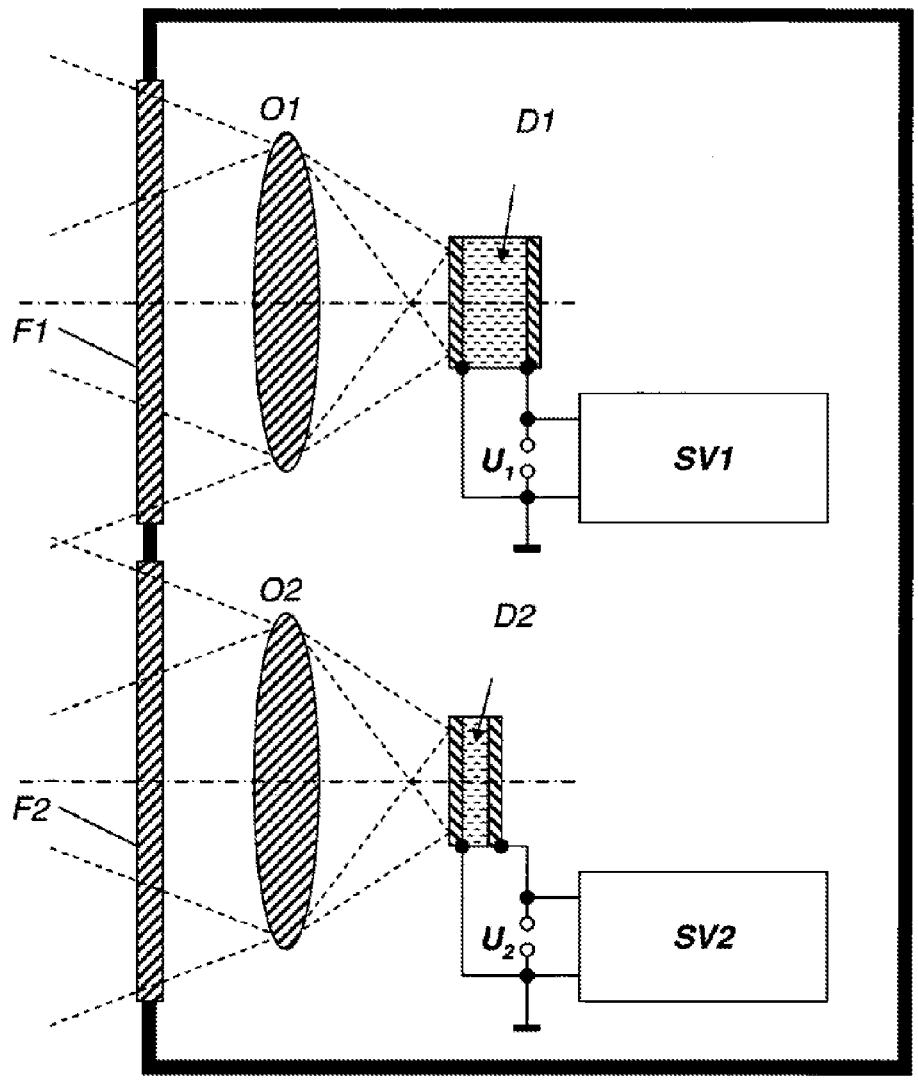
FIG. 1 shows an exemplary sensor arrangement according to the prior art.
Figure 2:
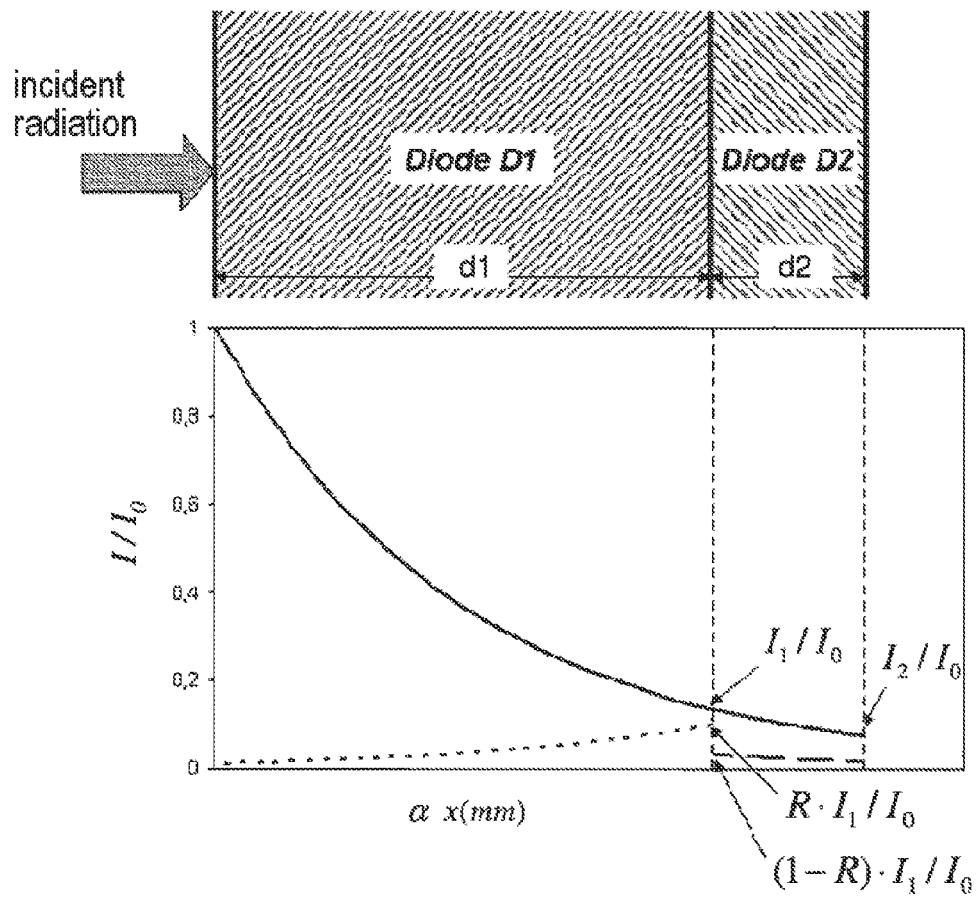
FIG. 2 shows a schematic representation of two diodes disposed in series according to the invention together with the intensity profile within the diodes.

In the sensor arrangement according to the invention, at least two sensors disposed in series (upper part in FIG. 2) use a common aperture and also a common optical arrangement (if an optical arrangement is necessary in an advantageous version of the invention). In the image plane of the optical arrangement there is a first diode D1 that converts the incident radiation into an electrical photocurrent. This diode is designed such that the sensitive layer (p-n junction) is very thick. In this way the majority of the incident photons are absorbed in this layer and, according to the quantum efficiency, converted into electron-hole pairs. D1 thus has high sensitivity, but at the same time is used as an effective attenuation filter for the second diode D2 that is disposed downstream and that thus has low sensitivity.

This will be illustrated by an example calculation, with which by way of example a dynamic range of 6 orders of magnitude is covered with two diodes, wherein each diode has a dynamic range of 3 orders of magnitude. As a result, in addition the ratio of the intensities absorbed in the respective p-n layers should be 1:1000.

The absorption law $I(x)=I_0 \cdot e^{-\alpha \cdot x}$ applies, wherein I refers to the intensity at the depth x of the diode D1 through whose surface the radiation $I_0$ is incident, and $\alpha$ is the coefficient of absorption of the diode D1. In the lower part of FIG. 2 the intensity profile within diodes D1, D2 is sketched with a solid line.

As diode material, by way of example silicon with a coefficient of absorption in the near IR spectral region of 100 cm$^{-1}$ is adopted. In order to absorb 99% of the intensity entering through the diode surface in the first diode D1, the thickness d1 of the diode is selected as 0.46 mm:

$$I_1 = I_0 \cdot e^{-4.6} = 0.01 \cdot I_0 \Rightarrow S_{D1} \propto I_0 - I_1 = 0.99 \cdot I_0$$

$S_{D1}$ refers to the output signal of the diode D1, which is proportional to the absorbed intensity. In order to achieve the desired ratio of the absorbed intensities $(I_0-I_1):(I_1-I_2)$, the thickness d2 of the diode D2 is specified as 0.01 mm, neglecting the absorption in the contact layers of the diodes D1, D2:

$$I_2 = I_0 \cdot e^{-4.7} = 0.009 \cdot I_0 \Rightarrow S_{D2} \propto I_1 - I_2 = 0.001 \cdot I_0 \Rightarrow S_{D1} : S_{D2} \approx 1000:1$$

In this example the thickness d1 of the first diode D1 must be selected to be very large in order to absorb 99% of the intensity, because the coefficient of absorption of silicon in the near infrared is relatively small.

In one advantageous form of the invention, a partly mirrored layer is therefore provided between the diodes D1, D2. This layer is advantageously applied to the rear side of the IR sensitive Si diode D1, so that the reflected radiation passes through the diode layer twice; the thickness of the diode can be reduced without changing the component of absorbed radiation. Part of the radiation incident on the beam splitter minor is thus reflected according to the reflection coefficients R (dotted line in FIG. 2 lower part), and part is accordingly (1−R) transmitted, wherein the internal absorption within the beam splitter layer is negligible (dashed line in FIG. 2 lower part).

In this case the above example calculation can be represented as follows. In order to absorb about 99% of the intensity entering through the diode surface in the first diode D1, the thickness d1 of the diode D1 is selected to be d1=0.23 mm, and the reflectance of the beam splitter is selected to be R=0.90:

$$I_1 = I_0 \cdot e^{-\alpha \cdot d1} = 0.1 \cdot I_0$$

$$S_{D1} \propto I_0 - I_1 + R \cdot I_1 \cdot (1 - e^{-\alpha \cdot d1}) = I_0 - I_1 \cdot (R \cdot (1 - e^{-\alpha \cdot d1}) - 1) = I_0 \cdot (1 - e^{-\alpha \cdot d1} + R \cdot e^{-\alpha \cdot d1} - R \cdot e^{-2 \cdot \alpha \cdot d1}) = 0.98 \cdot I_0$$

In order to achieve the desired ratio of absorbed intensities, the thickness d2 of D2 is again set to 0.01 mm:

$$I_2 = I_1 \cdot (1-R) \cdot e^{-\alpha \cdot d2} = I_0 \cdot (1-R) \cdot e^{-\alpha \cdot (d1+d2)} = 0.009 \cdot I_0$$

$$S_{D2} \propto I_1 \cdot (1-R) - I_1 \cdot (1-R) \cdot e^{-\alpha \cdot d2} = I_0 \cdot (1-R) \cdot (e^{-\alpha \cdot d1} - e^{-\alpha \cdot (d1+d2)}) = 0.001 I_0 \quad S_{D1} : S_{D2} \approx 1000 : 1$$

Figure 3:
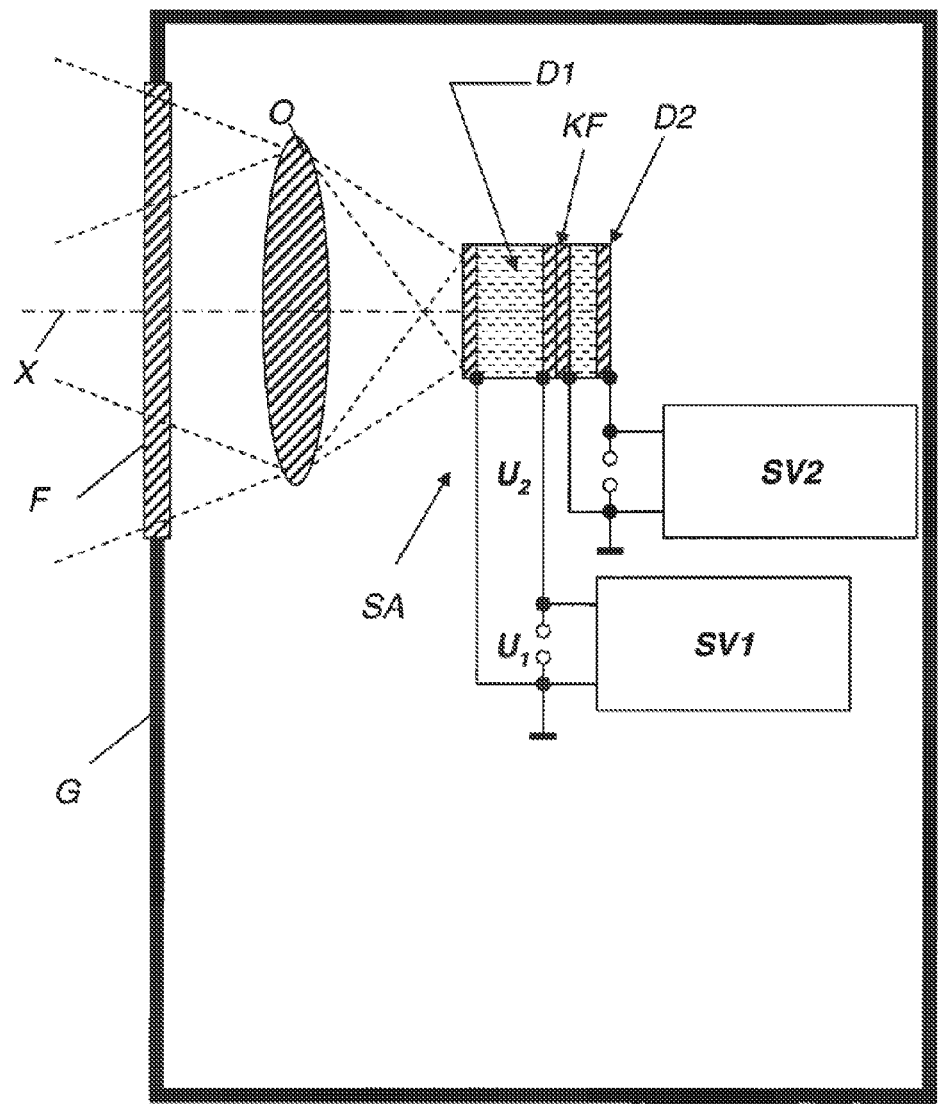
FIG. 3 shows a sensor arrangement according to the invention.

FIG. 3 shows a sensor arrangement according to the invention. The sensor arrangement SA is disposed in a housing G with a window F. The electromagnetic waves can be incident on the sensor arrangement SA through the window F. The sensor arrangement SA is formed of a first diode D1 and a second diode 2, wherein the diode D2 is disposed after the diode D1 in relation to the X axis. Each diode D1, D2 comprises contact connections $K_{11}$, $K_{12}$, $K_{21}$, $K_{22}$, with which they are each connected to a signal processing means SV1, SV2.

Diode D1 is used here as a detector for high sensitivity, diode D2 as a detector for low sensitivity. Both diodes are designed for the same operational wavelength region.

An optical arrangement O is advantageously provided perpendicular to the X axis and is disposed between the stack formed of diode D1 and diode D2 and the window F. The stack formed of diode D1 and diode D2 is advantageously disposed so that the diode D1 is positioned in the image plane of the optical arrangement O.

A partly mirrored layer (not illustrated) is provided between diode D1 and diode D2. Such a partly transparent beam splitter minor can, if it is made of a metallic layer, be used for contacting the adjacent contact surfaces KF of the two diodes D1, D2 at the same time.

Of course, cascading of more than two stacked diodes to further increase the dynamic range is possible, likewise a transfer to other spectral regions.

One advantage of the invention is that the output signals of both diodes D1, D2 acting as detectors for the laser sources to be observed are of the same order of magnitude. Thus the output signals can be further processed with essentially the same circuits for signal processing SV1, SV2. The sensor arrangement according to the invention also saves space and reduces the number of required optical components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An optical sensor arrangement, comprising:
   an aperture; and
   first and second sensors configured to detect electromagnetic waves passing through the aperture, wherein the first and second sensors are physically arranged in series so that electromagnetic waves passing through the aperture pass through the first sensor and then to the second sensor,
   wherein the first and second sensors have a same operational spectral region and cover a same region of surroundings to be observed,
   wherein the first sensor forms an attenuation filter for the second sensor, which is arranged downstream from the first sensor in a direction of the electromagnetic waves passing through the aperture, and
   wherein the first sensor comprises a first diode and the second sensor comprises a second diode, and wherein the first diode is thicker than the second diode such that a majority of intensity entering the aperture is absorbed by the first sensor, wherein the intensity absorbed by the first diode is on the order of 99%.

2. The sensor arrangement of claim 1, further comprising:
   a partly mirrored layer arranged between the first and second sensors.

3. The sensor arrangement of claim 1, wherein the first and second sensors are diodes with a p-n or n-p junction.

4. The sensor arrangement of claim 1, further comprising:
   an optical arrangement configured between the aperture and the first and second sensors.

5. The sensor arrangement of claim 4, wherein the first sensor is positioned in an image plane of the optical arrangement.

6. The sensor arrangement of claim 1, further comprising:
   a signal processing arrangement connected to the first and second sensors.

7. The sensor arrangement of claim 1, the first sensor has a higher sensitivity than the second sensor.

\* \* \* \* \*